US006031599A

United States Patent [19]

Sheng et al.

[11] Patent Number: 6,031,599

[45] Date of Patent: Feb. 29, 2000

[54] PHOTO PRINTER WITH AN ADJUSTABLE THERMAL PRINT HEAD

[75] Inventors: Gary Sheng, Tao yuan; Hans Chang, Taichung Hsien; Jones Chang, Chu-Pa, all of Taiwan

[73] Assignee: Mustek Systems Inc., Hsin-Chu, Taiwan

[21] Appl. No.: 09/148,052

[22] Filed: Sep. 3, 1998

[51] Int. Cl.[7] ............................ G03B 27/04; G03B 27/52

[52] U.S. Cl. ................................................ 355/97; 355/40

[58] Field of Search ......................... 355/97, 104, 27–29, 355/40, 41; 400/120.16, 120.17; 347/214

[56] References Cited

U.S. PATENT DOCUMENTS 5,157,415 10/1992 Seyasu ............................... 400/120.17

5,507,582 4/1996 Mistyurik ............................ 400/120.16

5,546,115 8/1996 Nardone et al. ........................ 347/214

*Primary Examiner*—Safet Metjahic
*Assistant Examiner*—Hung Henry Nguyen
*Attorney, Agent, or Firm*—Winston Hsu

[57] ABSTRACT

The present invention provides a photo printer with an adjustable thermal print head. The printer includes a cantilever mechanism that raises or lowers a thermal print head for either removing a photo or printing the photo. The force exerted on the thermal print head is adjusted by an adjusting mechanism which uses an elastic mechanism with an adjusting screw and a spring. A platen roller feeds the photo through the device. The contacting stress between the thermal print heads and the platen roller is individually adjusted so that pressure can be maintained evenly at all times.

3 Claims, 4 Drawing Sheets

PHOTO PRINTER WITH AN ADJUSTABLE THERMAL PRINT HEAD

BACKGROUND OF THE INVENTION

1. Field of the invention

The present invention relates to a photo printer, and more particularly, to a photo printer with an adjustable thermal print head for adjusting the contacting stress between the thermal print head and platen roller during photo printings.

2. Description of the prior art

To print high quality photos, the thermal print head and platen roller within the photo printer must be properly adjusted and in even contact with each other. Therefore, precise assembly technique is essential.

Please refer to FIG. 1 and FIG. 1A. FIG. 1 is a schematic diagram of a prior art photo printer 10, FIG. 1A is a perspective view of the photo printer 10. The photo printer 10 comprises a housing 11, a cantilever mechanism 12 rotatably mounted on the housing 11, a thermal print head 14 installed at one end of the cantilever mechanism 12 for printing a photo 38 by heating a ribbon 16, a platen roller 20 rotatably installed in the housing 11 under the thermal print head 14 for carrying the photo 18 forward and backward through the thermal print head 14, a driving mechanism 22 for rotating the cantilever mechanism 12 to drive the thermal print head 14 downward to print the photo when the photo is carried forward by the platen roller or upward when the photo is carried backward by the platen roller, and an elastic strip 24 installed in the housing 11 located at the bottom end of the platen roller 20. When the thermal print head moves downward a fixed distance, it generates a pressure that distorts the elastic strip 24 which then generates a fixed contacting stress between the thermal print head 14 and the platen roller 20.

Please refer to FIG. 2 and FIG. 2A. FIG. 2 is a schematic diagram of another prior art photo printer 30, FIG. 2A is a perspective view of the photo printer 30. The photo printer 30 comprises a housing 31, a shaft 44 installed on the housing 31, a cantilever mechanism 32 rotatably mounted on the shaft 44, a thermal print head 34 installed at one end of the cantilever mechanism 32 for printing a photo 38 by heating a ribbon 36, a platen roller 40 rotatably installed in the housing 31 under the thermal print head 34 for carrying the photo 38 forward and backward through the thermal print head 34, an elastic arm 46 rotatably mounted on the shaft 44 and located at the upper end of the cantilever mechanism 32, an elastic strip 48 installed between the cantilever mechanism 32 and the elastic arm 46, and a wheel 50 installed at the upper end of the elastic arm 46. During printing, the wheel 50 moves downward a fixed distance generating a fixed amount of pressure on the elastic arm 46 and the cantilever mechanism 32 which generates a fixed amount of contacting stress between the thermal print head 34 and the platen roller 40.

Precise assembly and adjustment procedures are necessary to ensure the thermal print heads 14, 34 and the platen rollers 20, 40 are in even contact. This is time-consuming and costly.

SUMMARY OF THE INVENTION

It is therefore a primary objective of the present invention to provide a photo printer with a thermal print head generating adjustable contacting stress during printing to solve above mentioned problem.

In a preferred embodiment, the present invention provides a photo printer comprising:

a housing;

a cantilever mechanism having first and second ends wherein the first end is rotatably installed in the housing;

a thermal print head installed at the second end of the cantilever mechanism for printing a photo by heating a ribbon;

a platen roller rotatably installed in the housing under the thermal print head for carrying the photo forward and backward through the thermal print head;

a driving mechanism for rotating the cantilever mechanism to move the thermal print head downward to print the photo when the photo is carried forward by the platen roller or upward when the photo is carried backward by the platen roller; and an adjusting mechanism installed between the thermal print head and the cantilever mechanism for adjusting the force exerted by the driving mechanism through the cantilever mechanism on the thermal print head. The adjusting mechanism adjusts the pressure exerted by the cantilever mechanism on the right and left sides of the thermal print head, and thus allows the thermal print head to evenly contact the platen roller for effective photo printing.

These and other objectives of the present invention will no doubt become obvious to those of ordinary skill in the art after reading the following detailed description of the preferred embodiment which is illustrated in the various figures and drawings.

DETAILED DESCRIPTION OF THE PREFERRED EMBODIMENT

Figure 3:
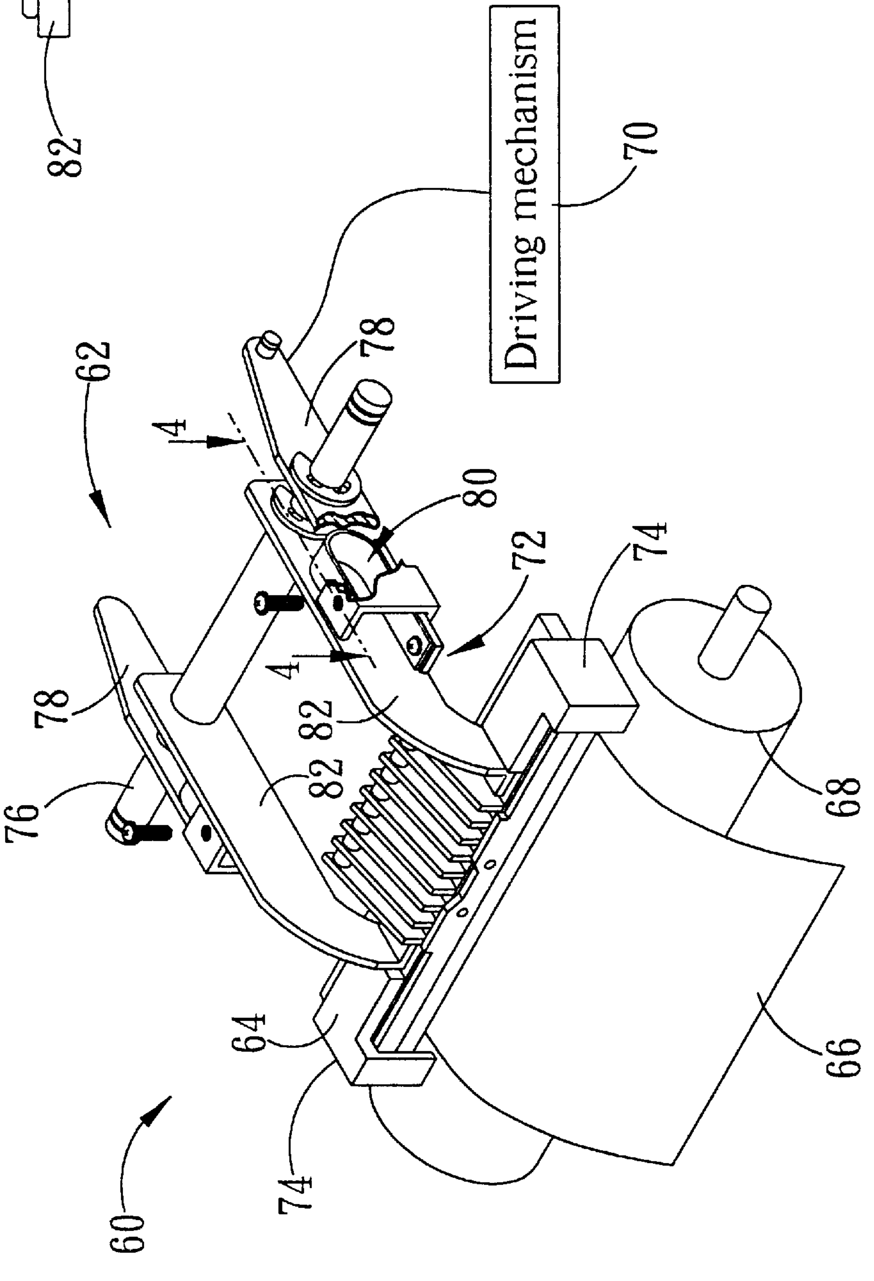
FIG. 3 is a schematic diagram of a photo printer according to the present invention.
Figure 3A:
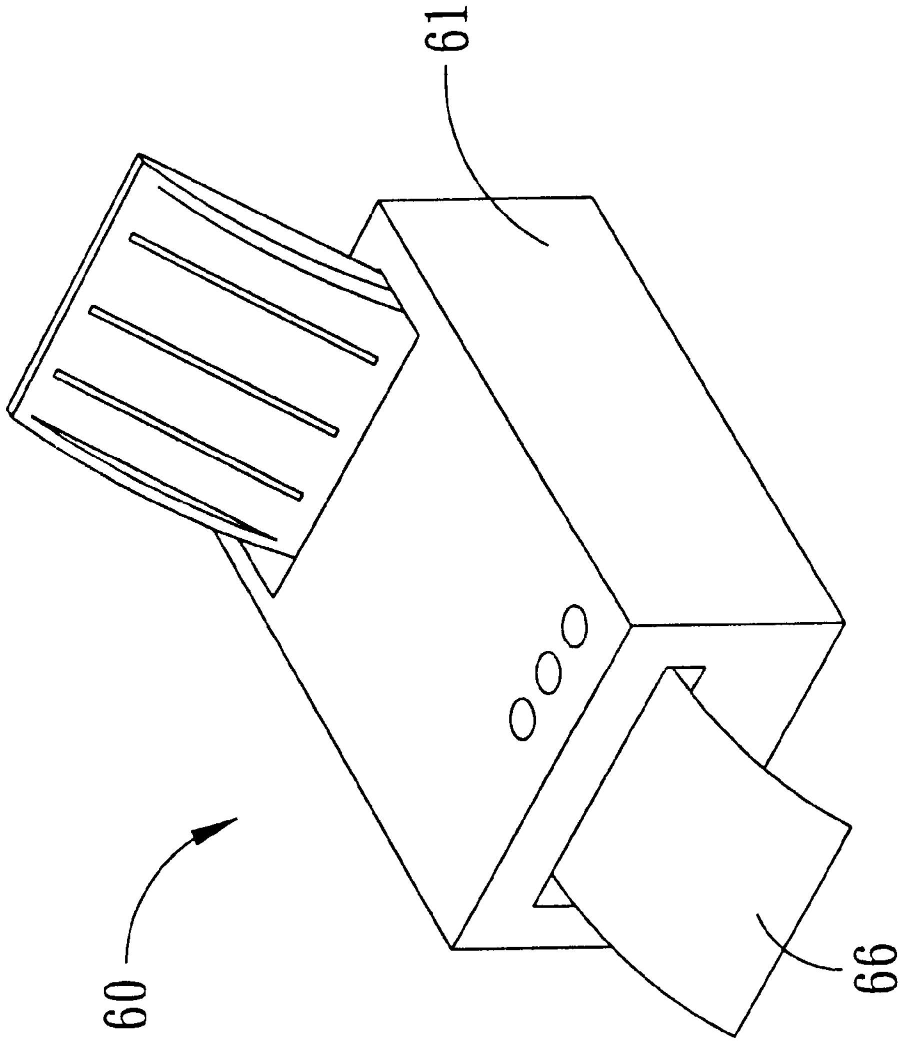
FIG. 3A is a perspective view of the photo printer in FIG. 3.

Please refer to FIG. 3 and FIG. 3A. FIG. 3 is a schematic diagram of a photo printer 60 according to the present invention, FIG. 3A is a perspective view of the photo printer 60. The photo printer 60 comprises a housing 61 for installing other components of the photo printer 60, a shaft 76, a cantilever mechanism 62 having two arms 78 rotatably installed on the shaft 76, a thermal print head 64 having its right and left ends 74 installed on one end of two thermal print head arms 82 to print a photo 66 by heating a ribbon (not shown), two thermal print head arms 82 installed between the two ends 74 of the thermal print head 64 and the shaft 76 for allowing the thermal print head to rotate around the shaft 76, a platen roller 68 rotatably installed under the thermal print head 64 for carrying the photo 66 forward and backward through the thermal print head 64, a driving mechanism 70 for rotating the cantilever mechanism 62 to move the thermal print head 64 downward to print the photo when the photo is carried forward by the platen roller or upward when the photo is carried backward by the platen roller, and an adjusting mechanism 72 installed between the two thermal print head arms 82 and the two arms 78 of the cantilever mechanism 62 for adjusting the force exerted by the driving mechanism 70 through the two arms of the cantilever mechanism 62 onto the two ends 74 of the thermal print head to allow the thermal print head 64 to effectively print the photo 66.

Figure 1:
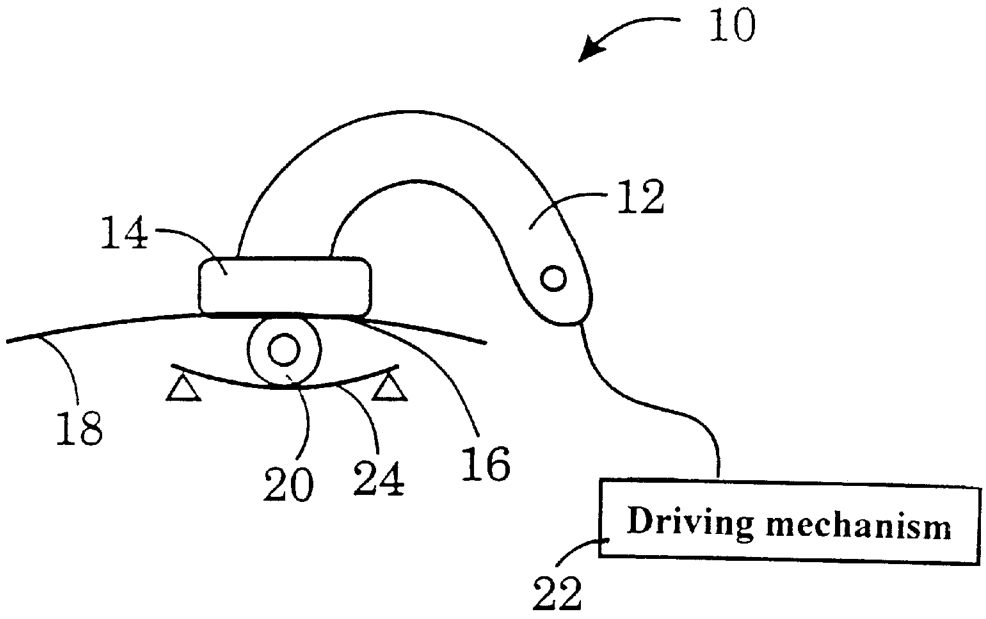
FIG. 1 Prior Art
FIG. 1 is a schematic diagram of a prior art photo printer.
Figure 2:
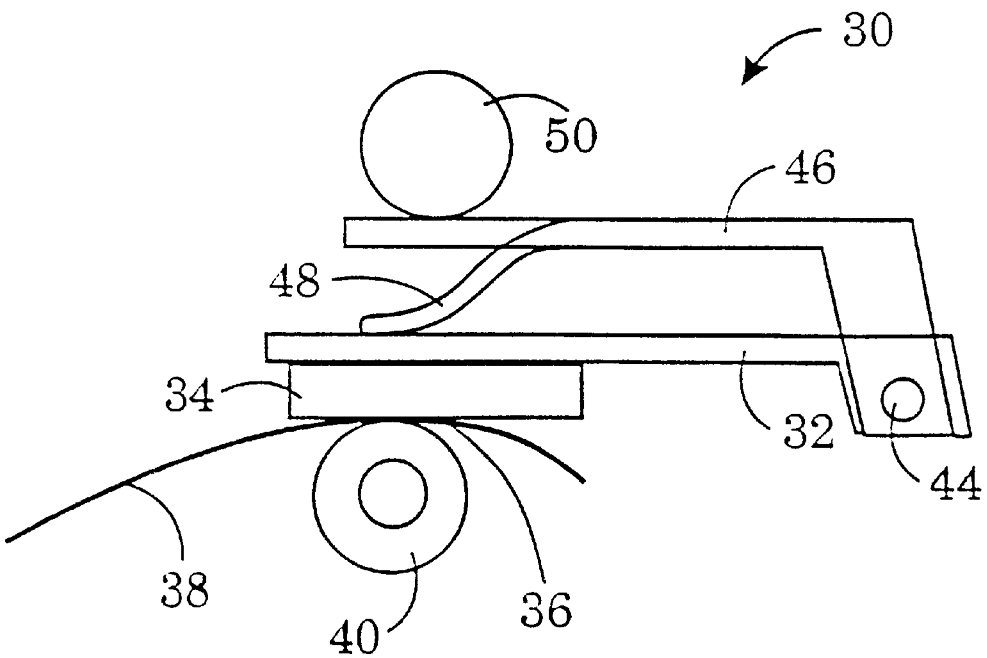
FIG. 2 Prior Art
FIG. 2 is a schematic diagram of another prior art photo printer.
Figure 1A:
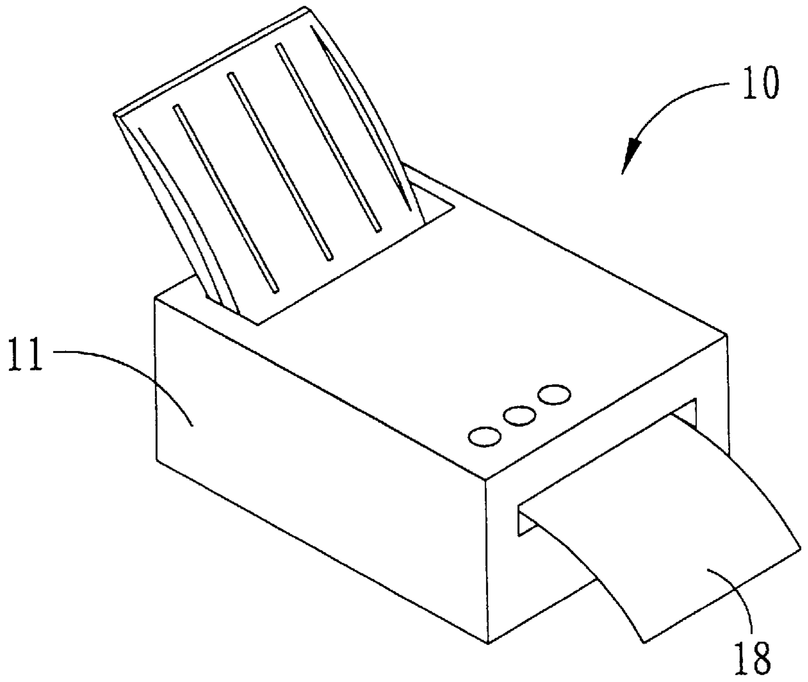
FIG. 1A Prior art
FIG. 1A is a perspective view of the photo printer in FIG. 1.
Figure 2A:
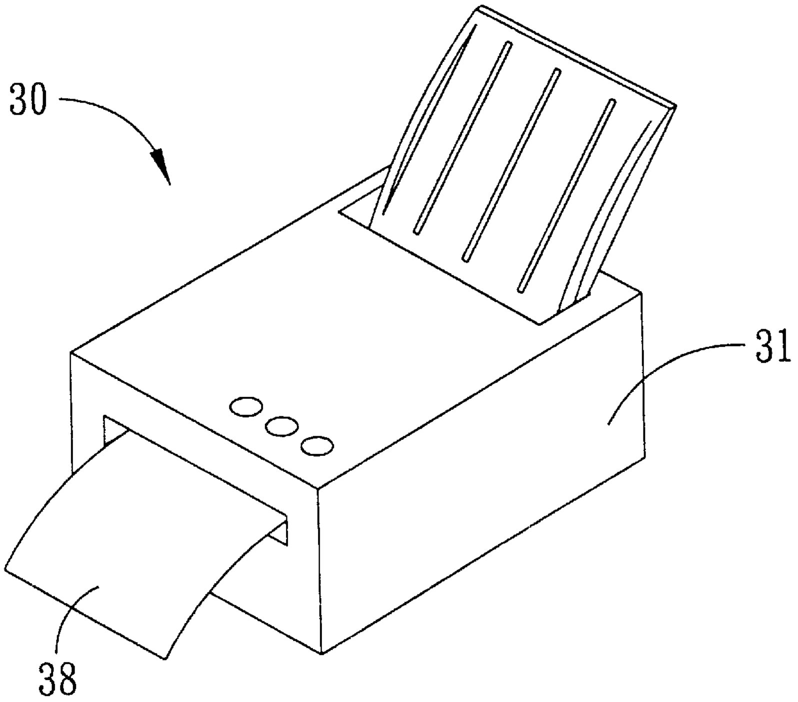
FIG. 2A Prior art
FIG. 2A is a perspective view of the photo printer in FIG. 2.
Figure 4:
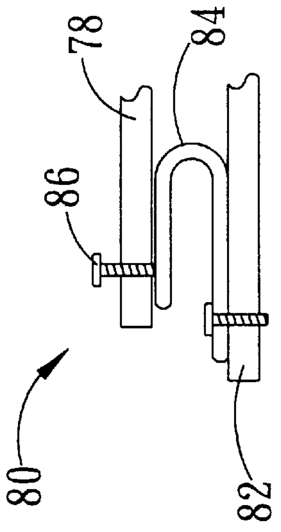
FIG. 4 is a sectional view along line 4—4 of the photo printer shown in FIG. 3.

Please refer to FIG. 4. FIG. 4 is a sectional view along line 4—4 of the photo printer 60. The adjusting mechanism 72 comprises two adjustable elastic mechanisms 80 each installed between the two arms 78 of the cantilever mechanism 62 and the two thermal print head arms 82. Each of the two elastic mechanisms 80 comprises a U-shaped elastic strip 84 for transmitting force from the arms 78 of the cantilever mechanism 62 to the thermal print head arms 82, and an adjusting screw 86 for adjusting the curvature of the elastic strip 84 and the force exerted on the strip 84. When the adjusting screw 86 is adjusted, the stress of the elastic strip 84 is altered which adjusts the force exerted by the arms 78 of the cantilever mechanism 62 on the thermal print head arms 82. This adjusts the downward contacting stress between the thermal print head 64 and the platen roller 68 accordingly. The adjusting screw 86 of each elastic mechanisms 80 can be adjusted individually, and thus the force exerted by the arms 78 of the cantilever mechanism 62 on the thermal print head arms 82 can be adjusted individually. Therefore, even contacting stress can be maintained between the thermal print head 64 and the platen roller 68.

Compared with the prior art photo printers, the photo printer 64 according to the present invention adjusts the contacting stress between the thermal print head 64 and the platen roller 68 through operations of the adjusting mechanism 72. The two elastic mechanisms of the adjusting mechanism 72 can be adjusted individually causing even contacting stress between the thermal print head 64 and the platen roller 68. Not only can the contacting stress generated by the thermal print head 64 at printing be easily adjusted, assembling the components of the photo printer is also much easier.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A photo printer comprising:

a housing;

a shaft installed inside the housing;

a cantilever mechanism installed inside the housing having two arms, the two arms of the cantilever mechanism being rotatable installed on the shaft;

a thermal print head installed inside the housing for printing a photo by heating a ribbon, the thermal print head having two ends and two arms installed between its two ends and the shaft for allowing the thermal print head to rotate around the shaft;

a platen roller rotatably installed in the housing under the thermal print head for carrying the photo forward or backward through the thermal print head;

a driving mechanism for rotating the two arms of the cantilever mechanism to move the thermal print head downward to print the photo when the photo is carried forward by the platen roller or upward when the photo is carried backward by the platen roller; and two adjustable elastic mechanisms installed separately between the two arms of the cantilever mechanism and the two arms of the thermal print head for allowing the two arms of the cantilever mechanism to adjustable exert force on the two arms of the thermal print head.

2. The adjusting mechanism of claim 1 wherein each of the two adjustable elastic mechanisms comprises a spring and an adjusting screw for adjusting the stress of the spring.

3. The adjusting mechanism of claim 2 wherein the spring is a U-shaped elastic strip and the adjusting screw adjusts the stress of the elastic strip by adjusting its curvature.

* * * * *